United States Patent
Simofi-Ilyes et al.

(10) Patent No.: US 6,979,922 B2
(45) Date of Patent: Dec. 27, 2005

(54) COMMUTATOR WITH INTEGRAL OIL THROW AND RECOVERY STRUCTURE

(75) Inventors: Attila Simofi-Ilyes, London (CA); Andrew Lakerdas, London (CA)

(73) Assignee: Siemens VDO Automotive Inc., Chatham (CA)

( * ) Notice: Subject to any disclaimer, the term of this patent is extended or adjusted under 35 U.S.C. 154(b) by 136 days.

(21) Appl. No.: 10/690,363

(22) Filed: Oct. 21, 2003

(65) Prior Publication Data

US 2005/0082937 A1    Apr. 21, 2005

(51) Int. Cl.⁷ .............................................. H02K 7/08
(52) U.S. Cl. ...................................... 310/90; 310/233
(58) Field of Search ........................... 310/90, 233, 236

(56) References Cited

U.S. PATENT DOCUMENTS

| | | |
|---|---|---|
| 1,014,628 A | 1/1912 | Lieber |
| 1,875,204 A | 8/1932 | Apple |
| 2,483,013 A | 9/1949 | Kopprasch |
| 2,950,402 A | 8/1960 | Glaza |
| 3,129,350 A | 4/1964 | Clark |
| 3,573,510 A | 4/1971 | Otto |
| 3,624,434 A | 11/1971 | Dafler et al. |
| 4,820,948 A | 4/1989 | Rogelein |
| 5,497,039 A | 3/1996 | Blaettner et al. |
| 5,736,799 A | 4/1998 | Harano |
| 6,008,557 A | 12/1999 | Dornhoefer |
| 6,307,296 B1 | 10/2001 | Schmidt et al. |
| 2001/0006313 A1 | 7/2001 | Kikuchihara et al. |
| 2002/0117931 A1 | 8/2002 | Campbell |

Primary Examiner—Burton Mullins

(57) ABSTRACT

A commutator 100 for an electric motor includes a body 112 having opposing ends. Commutator bars 118 are attached to a periphery of the body. Oil throw and recovery structure 122 is integral with the body and is disposed at one of the ends of the body. The oil throw and recovery structure 122 flares outwardly from the one end of the body and defines a continuously curved, annular surface 124 terminating in an annular tip 126. The commutator 100 is constructed and arranged to be mounted to a shaft 128 with the oil throw and recovery structure 122 being adjacent to a bearing 132. The oil throw and recovery structure is constructed and arranged to deflect oil, moving from the bearing and contacting the annular surface, in a direction away from the one end of the body with the annular tip directing the oil back to the bearing.

8 Claims, 3 Drawing Sheets

COMMUTATOR WITH INTEGRAL OIL THROW AND RECOVERY STRUCTURE

FIELD OF THE INVENTION

The invention relates to brush type DC motors where lubricant is used in an open-bushing assembly with structure provided to stop lubricant migration out of the bushing along a shaft onto a commutator surface of the motor.

BACKGROUND OF THE INVENTION

FIG. 1 is a view of a conventional armature assembly 10, of a DC motor, shown without the windings for clarity of illustration. A commutator 12 and oil throw washer 14 of the assembly 10 are provided as two separate parts/components near a lamination stack 15. The oil throw washer 14 is mounted to a shaft 16 adjacent to the commutator and prevents oil that migrates, from a bushing (not shown) and along the shaft, from contacting the commutator.

Providing a separate washer 14 results in an additional component cost and additional assembly cost and thus increases the overall cost of the armature assembly 10.

Accordingly, there is a need to provide an armature assembly of reduced cost by integrating an oil throw and recovery structure into the structure of the commutator.

SUMMARY OF THE INVENTION

An object of the invention is to fulfill the need referred to above. In accordance with the principles of the present invention, this objective is obtained by providing a commutator for an electric motor. The commutator has a body having opposing ends. Commutator bars are attached to a periphery of the body. Oil throw and recovery structure is integral with the body and is disposed at one of the ends of the body. The oil throw and recovery structure flares outwardly from the one end of the body and defines a continuously curved, annular surface terminating in an annular tip. The commutator is constructed and arranged to be mounted to a shaft with the oil throw and recovery structure being adjacent to a bearing. The oil throw and recovery structure is constructed and arranged to deflect oil, moving from the bearing and contacting the annular surface, in a direction away from the one end of the body with the annular tip directing the oil back to the bearing.

In accordance with another aspect of the invention, a DC motor includes a shaft, a bearing associated with an end of the shaft to permit rotation of the shaft, a bearing retainer retaining the bearing with respect to an end of the motor, brushes, and a commutator coupled with the shaft for rotation therewith. The commutator includes a body having opposing ends. Commutator bars are attached to a periphery of the body so as to contact the brushes. Oil throw and recovery structure is integral with the body and is disposed at one of the ends of the body. The oil throw and recovery structure flares outwardly from the one end of the body and defines a continuously curved, annular surface terminating in an annular tip. The bearing retainer defines a generally V-shaped channel generally adjacent to the annular tip. The oil throw and recovery structure is adjacent to the bearing so as to deflect oil, moving from the bearing and contacting the annular surface, in a direction away from the one end of the body, with the annular tip directing the oil to the V-shaped channel and back to the bearing.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
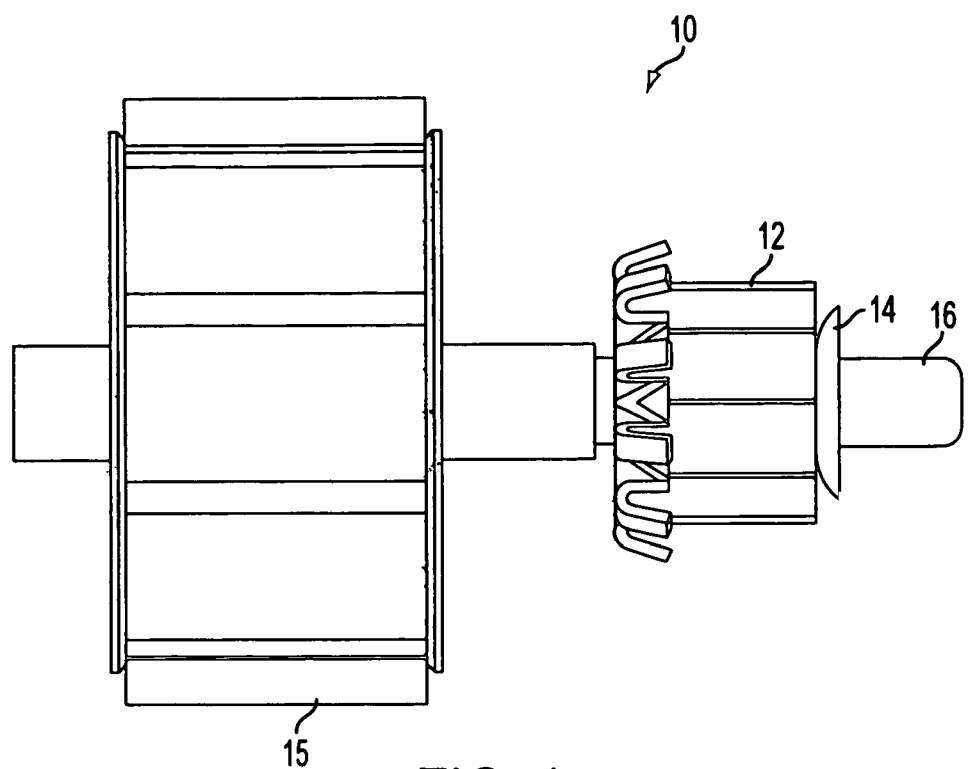
FIG. 1 is a view of a conventional armature assembly having an oil throw washer mounted adjacent to a commutator.
Figure 2:
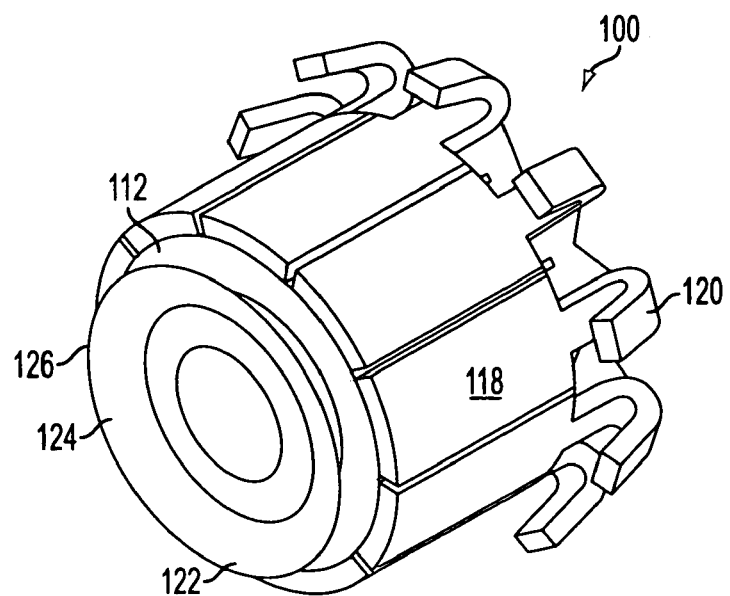
FIG. 2 is a perspective view of a commutator including integral oil throw and recovery structure in accordance with the principles of the invention.
Figure 3:
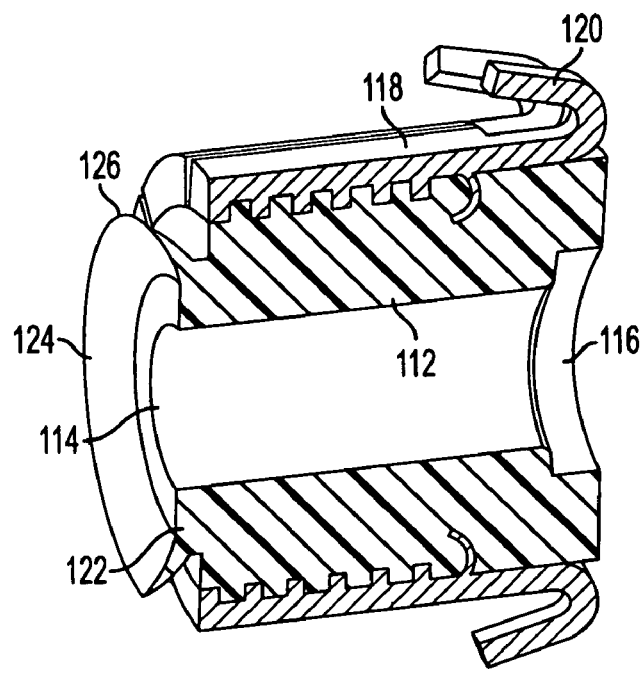
FIG. 3 is a cross-sectional view of the commutator of FIG. 2.

With reference to FIGS. 2 and 3, a commutator for an electric motor is shown, generally indicated at 100, in accordance with the principles of the invention. The commutator 100 includes a body 112, of electrically insulating material, having opposing ends 114 and 116. A plurality of commutator bars 118 is attached to a periphery of the body 112 in the conventional manner. Each commutator bar 118 includes a conventional commutator hook 120 at end thereof for connecting the bars 118 to the motor windings (not shown).

In the embodiment, an oil throw and recovery structure 122 is integral with the body at end 114. The oil throw and recovery structure 122 flares outwardly from the end 114 of the body 112 and defines a continuously curved, annular surface 124 terminating in an annular tip 126, the function of which will be explained below. The annular surface 124 has a diameter less than a diameter of the commutator 100.

Figure 4:
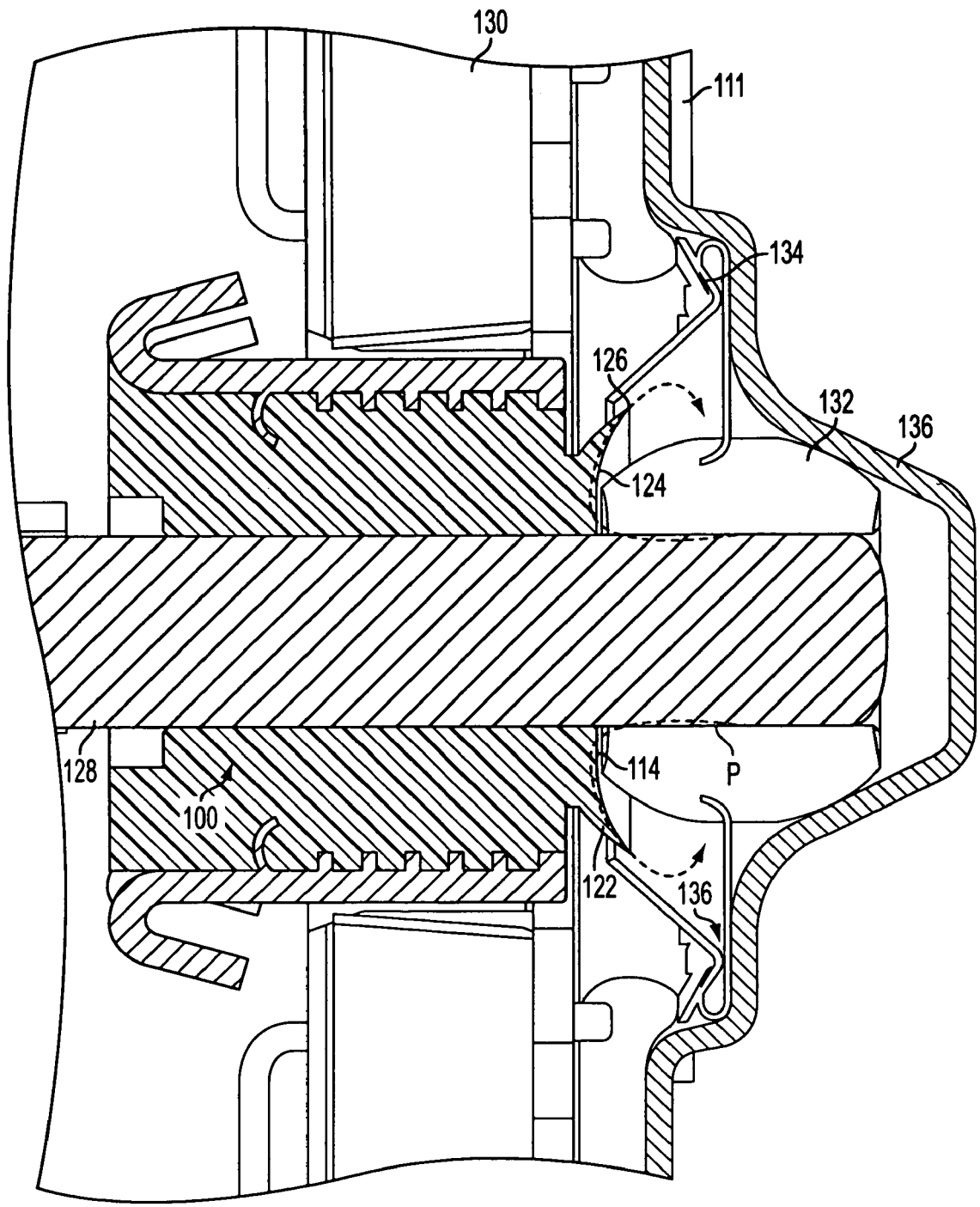
FIG. 4 is an enlarged cross-sectional view of the commutator of FIG. 2 shown mounted on a shaft and deflecting oil from a bushing/sleeve bearing.

FIG. 4 shows the commutator 100 mounted on a shaft 128 of an electric motor 111 for rotation with the shaft 128. DC current is fed to the windings through brushes 130 that ride of the commutator 100 in the conventional manner. Thus, the motor 111 is preferably a brush type, permanent magnet DC motor. A bushing/sleeve bearing 132 supporting and end of the shaft 128 for rotation is adjacent to the oil throw and recovery structure 122 of the commutator 100. A bushing retainer 134 retains the bushing/sleeve bearing 132 within the end cap 136 of the motor. The oil throw and recovery structure 122 is constructed and arranged to deflect oil, moving from the bushing/sleeve bearing 132 and contacting the annular surface 124, in a direction away from the end 114 of the commutator body 112 with the annular tip 126 directing the oil back to the bushing/sleeve bearing 132.

In addition, as shown in FIG. 4, the bushing retainer 134 defines a generally V-shaped channel 136 that is constructed and arranged to receive oil thrown by the oil throw and recovery structure 122 and deflect it back to the bushing/sleeve bearing 132. More particularly, the oil, indicated in dashed lines P in FIG. 4, tends to migrate out of the bushing/sleeve bearing 132 along the shaft 128 towards the commutator 100. This phenomenon is due to a combination of different effects (such as pumping effect, temperature/surface tension, etc. . . . ). In the absence of the oil throw and recovery structure 122, oil would migrate further onto the commutator surface (commutator surface facing the brushes) and this would have negative impact on commutation and motor performance. However the commutator 100 with integrated oil throw and recovery structure 122 redirects the oil flow back towards the bushing/sleeve bearing 132 and at the tip 126 will cause oil particles/droplets to be thrown to the V-shaped channel 136 and thus back to the bushing/sleeve bearing 132. This oil redirecting is achieved due to the shape of oil throw and recovery structure 122 and the centrifugal force acting on the oil particles during armature rotation.

Figure 5:
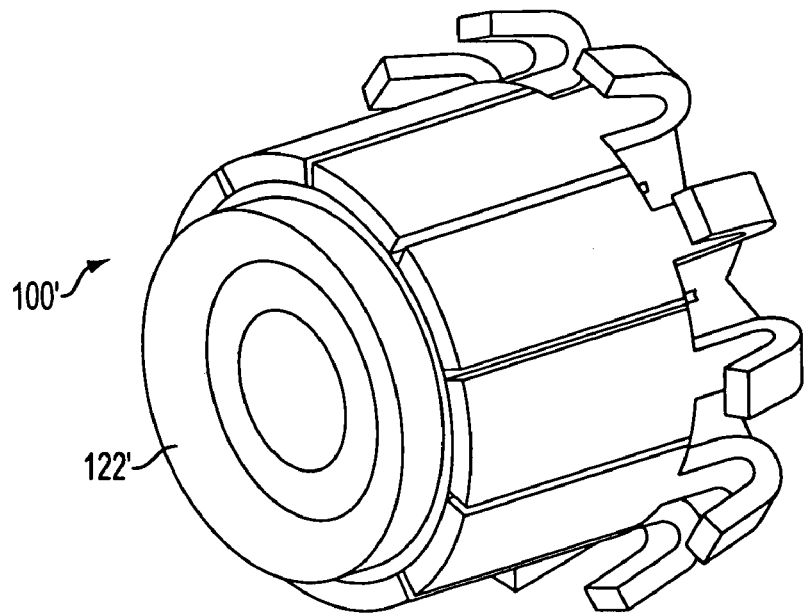
FIG. 5 is a perspective view of a commutator having an integral oil throw and recovery structure shown prior to a machining step.

Current commutator molding/manufacturing methods may not accommodate the integrated oil throw and recovery structure 122 without redesigning the molding tool and process. Therefore, the commutator 100' could be made as shown in FIG. 5 with pre-machined structure 122', and the final shape of the oil throw and recovery structure 122 (as shown in FIGS. 2 and 3) would be machined after either when the commutator slots are being cut or during armature assembly when the commutator surface is cut.

Since the oil throw and recovery structure 122 is molded into the commutator body 112 or machined, the additional component cost and assembly cost is eliminated.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A DC motor including:
   a shaft,
   a bearing associated with an end of the shaft to permit rotation of the shaft,
   a bearing retainer retaining the bearing with respect to an end of the motor,
   brushes, and
   a commutator coupled with the shaft for rotation therewith, the commutator comprising:
   a body having opposing ends,
   commutator bars attached to a periphery of the body so as to contact the brushes, and
   oil throw and recovery structure integral with the body and disposed at one of the ends of the body, the oil throw and recovery structure flaring outwardly from the one end of the body and defining a continuously curved, annular surface terminating in an annular tip,
   the bearing retainer defining a generally V-shaped channel defined by a pair of legs, with one leg being disposed at an angle with respect to an axis of the shaft and extending beyond the annular tip so that the annular tip is within bounds of the V-shaped channel and the other leg being disposed generally transverse with respect to the axis of the shaft, the oil throw and recovery structure being adjacent to the bearing so as to deflect oil, moving from the bearing and contacting the annular surface, in a direction away from the one end of the body, with the annular tip directing the oil to the V-shaped channel and back to the bearing,
   wherein the oil throw and recovery structure and the body are a single, molded component.

2. The motor of claim 1, wherein each commutator bar includes a hook at an end thereof.

3. The motor of claim 1, wherein the annular surface has a diameter less than a diameter of the commutator.

4. The motor of claim 1, with the body is of an electrically insulating material.

5. A DC motor including:
   a shaft,
   a bearing associated with an end of the shaft to permit rotation of the shaft,
   means for retaining the bearing with respect to an end of the motor,
   brushes, and
   a commutator coupled with the shaft for rotation therewith, the commutator comprising:
   a body having opposing ends,
   commutator bars attached to a periphery of the body so as to contact the brushes, and
   means for throwing and recovering oil integral with the body and disposed at one of the ends of the body, the means for throwing and recovering oil flaring outwardly from the one end of the body and defining a continuously curved, annular surface terminating in an annular tip,
   the means for retaining defining a generally V-shaped channel defined by a pair of legs, with one leg being disposed at an angle with respect to an axis of the shaft and extending beyond the annular tip so that the annular tip is within bounds of the V-shaped channel and the other leg being disposed generally transverse with respect to the axis of the shaft, the means for throwing and recovering oil being adjacent to the bearing so as to deflect oil, moving from the bearing and contacting the annular surface, in a direction away from the one end of the body, with the annular tip directing the oil to the V-shaped channel and back to the bearing,
   wherein the oil throw and recovery structure and the body are a single, molded component.

6. The motor of claim 5, wherein each commutator bar includes a hook at an end thereof.

7. The motor of claim 5, wherein the annular surface has a diameter less than a diameter of the commutator.

8. The motor of claim 5, with the body is of an electrically insulating material.

\* \* \* \* \*